(12) United States Patent
Zhang

(10) Patent No.: US 8,072,441 B2
(45) Date of Patent: Dec. 6, 2011

(54) DEVICE AND METHOD FOR DETECTING MULTIPLE TOUCH POINTS

(75) Inventor: Chen Zhang, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 419 days.

(21) Appl. No.: 12/475,591

(22) Filed: May 31, 2009

(65) Prior Publication Data

US 2010/0295815 A1  Nov. 25, 2010

(30) Foreign Application Priority Data

May 20, 2009  (CN) .......................... 2009 1 0084135

(51) Int. Cl.
  *G06F 3/045* (2006.01)
(52) U.S. Cl. ..................................... 345/174; 178/18.05
(58) Field of Classification Search .......... 345/173–178; 178/18.01–18.09, 18.11, 20.01
See application file for complete search history.

(56) References Cited

U.S. PATENT DOCUMENTS

| | | | |
|---|---|---|---|
| 2002/0015024 A1* | 2/2002 | Westerman et al. | 345/173 |
| 2005/0104867 A1* | 5/2005 | Westerman et al. | 345/173 |
| 2008/0062139 A1* | 3/2008 | Hotelling et al. | 345/173 |
| 2008/0062140 A1* | 3/2008 | Hotelling et al. | 345/173 |
| 2009/0009487 A1* | 1/2009 | Nishitani et al. | 345/174 |
| 2009/0174676 A1* | 7/2009 | Westerman | 345/173 |
| 2009/0184939 A1* | 7/2009 | Wohlstadter et al. | 345/173 |
| 2009/0189877 A1* | 7/2009 | Washino et al. | 345/174 |
| 2009/0244031 A1* | 10/2009 | Westerman et al. | 345/174 |

* cited by examiner

*Primary Examiner* — Stephen Sherman
(74) *Attorney, Agent, or Firm* — Wuxi Sino IP, Ltd.; Joe Zheng

(57) ABSTRACT

Techniques for detecting multiple touch points for touch screens are disclosed. A touch screen includes a first conductive layer and a second conductive layer, each conductive layer having a positive terminal and a negative terminal. Efficient operations of detecting multiple points on the touch screen are described using various voltage/currents differences from the positive and negative terminals of the first and second conductive layers.

11 Claims, 7 Drawing Sheets

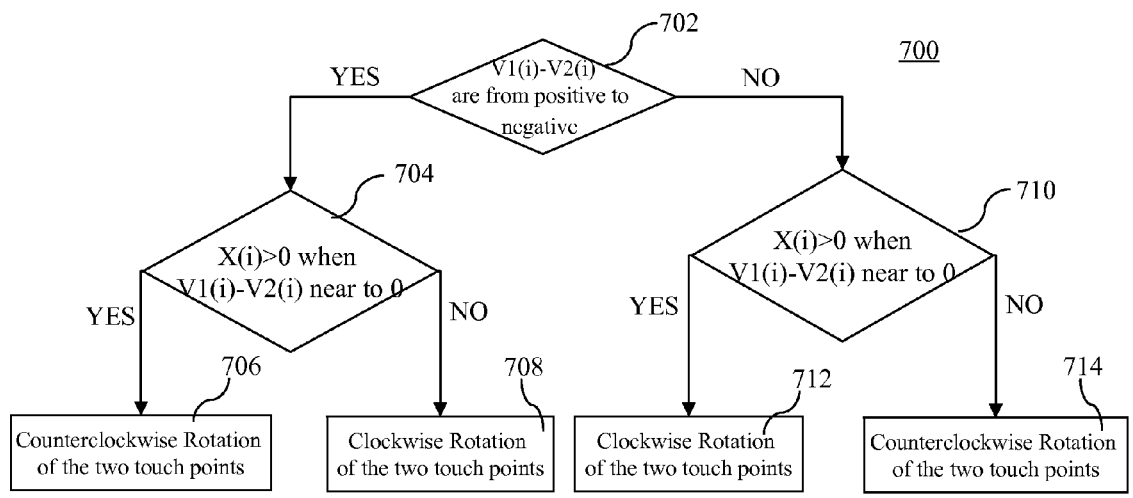
FIG. 7A
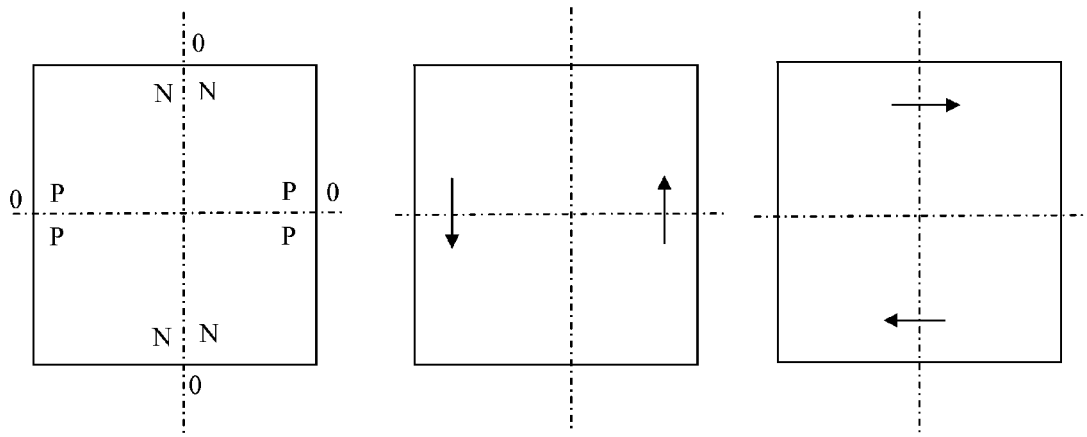
FIG. 7B  FIG. 7C  FIG. 7D

FIG. 7E  FIG. 7F  FIG. 7G

DEVICE AND METHOD FOR DETECTING MULTIPLE TOUCH POINTS

BACKGROUND OF THE INVENTION

1. Field of the Invention

The present invention relates to the area for touch screens, and more particularly to techniques for detecting multiple touch points on a touch screen.

2. Description of Related Art

Touch screens are gradually becoming main means of inputting information to an electronic system. Techniques for detecting multiple touch points are more attractive in the touch screen fields. However, techniques for detecting multiple touch points are mostly implemented on an optical touch screen, which are too expensive for most customers.

FIG. 1A is a schematic diagram showing a conventional four-wire resistive touch screen with a single touch point thereon. The four-wire resistive touch screen includes an X conductive layer and a Y conductive layer. The X conductive layer has a positive terminal Xp and a negative terminal Xn at two respective ends thereof. The Y conductive layer has a positive terminal Yp and a negative terminal Yn at two respective ends thereof. The X conductive layer is physically separated from the Y conductive layer by a spacer. When a touch point P1 with enough pressure appears on the resistive touch screen, the X conductive layer may contact with the Y conductive layer at the touching point P1. FIG. 1B is a circuit diagram showing an equivalent electrical circuit to the resistive touch screen shown in FIG. 1A.

To facilitate the description of the embodiment as shown, Xplate denotes a total resistance of the X conductive layer from the negative terminal Xn to the positive terminal Xp. The touching point P1 divides the total resistance Xplate into the resistances R1 and R3 proportionally as the X conductive layer has a uniform linear resistivity. Yplate denotes a total resistance of the Y conductive layer from the negative terminal YN to the positive terminal YP. The touch point P1 divides the total resistance Yplate into the resistances R4 and R6 proportionally as the Y conductive layer has a uniform linear resistivity. Rz denotes a contact resistance between the X conductive layer and the Y conductive layer at the touch point P1. Thus, the x and y coordinates of the touch point P1 may be located as long as the resistance values R3 and R6 are calculated.

The terminal Yp is connected to a positive reference voltage VT, the terminal Yn is grounded, and the voltage value V1 on the terminal Xp is measured. The voltage value V1 satisfies a following formula:

$$\frac{V1}{VT} = \frac{R6}{Yplate}.$$

Similarly, the terminal Xp is connected to the positive reference voltage VT, the terminal Xn is grounded, and the voltage value V3 on the terminal Yp is measured. The voltage value V3 satisfies a following formula:

$$\frac{V3}{VT} = \frac{R3}{Yplate}.$$

The resistance values R3 and R6 are calculated according to the above two formulas. So, the coordinates of the touch point P1 are located. However, the conventional four-wire resistive touch screen is mainly provided for detecting a single touch point on the touch screen. If there are two or more touch points on the touch screen, it is very difficult to determine a relative motion tendency of the two or more touch points by calculating the coordinates of each touch point.

Thus, improved techniques for method and device for detecting multiple touch points on a resistive touch screen are desired to overcome the above disadvantages.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to techniques for detecting multiple touch points for a touch screen. The touch screen includes a first conductive layer and a second conductive layer, each conductive layer having a positive terminal and a negative terminal. The operation of detecting multiple points on the touch screen includes: coupling the positive terminal of the second conductive layer to a positive reference voltage, coupling the negative terminal of the second conductive layer to a negative reference voltage, sampling the positive terminal of the first conductive layer to obtain a series of first voltage samples V1($i$), sampling the negative terminal of the first conductive layer to obtain a series of second voltage samples V2($i$); coupling the positive terminal of the first conductive layer to the positive reference voltage, coupling the negative terminal of the first conductive layer to the negative reference voltage, sampling the positive terminal of the second conductive layer to obtain a series of third voltage samples V3($i$), sampling the negative terminal of the second conductive layer to obtain a series of fourth voltage samples V2($i$), wherein i is a sampling number; calculating a rotating parameter X(i) according to the first voltage samples V1($i$), the second voltage samples V2($i$), the third voltage samples V3($i$) and the fourth voltage samples V4($i$); determining a rotating direction of two touch points in the touch screen according to the rotating parameter X(i); and wherein the rotating parameter X(i) is a function of $$\frac{Xplate}{V1(i) - V2(i)} - \frac{Yplate}{V3(i) - V4(i)},$$

and Xplate is a total resistance of the first conductive layer, and Yplate is a total resistance of the second conductive layer.

Thee are many features, benefits and advantages in the present invention which will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 7A is a flow chart showing a first embodiment of a method for recognizing a rotating motion of the two touch points on the resistive touch screen;

FIG. 7B is a diagram schematically showing a physical meaning of a rotating parameter used in the method shown in FIG. 7A;

FIG. 7C is an exemplary diagram schematically showing a counterclockwise rotation of the two touch points;

FIG. 7D is an exemplary diagram schematically showing a clockwise rotation of the two touch points;

FIG. 7E is another exemplary diagram schematically showing the clockwise rotation of the two touch points;

FIG. 7F is another exemplary diagram schematically showing the counterclockwise rotation of the two touch points;

FIG. 7G is a diagram schematically showing a physical meaning of a rotating parameter used in the method shown in FIG. 7H;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 2-8. However, those skilled in the art will readily appreciate that the detailed description given herein with respect to these figures is for explanatory purposes only as the invention extends beyond these limited embodiments.

Figure 4:
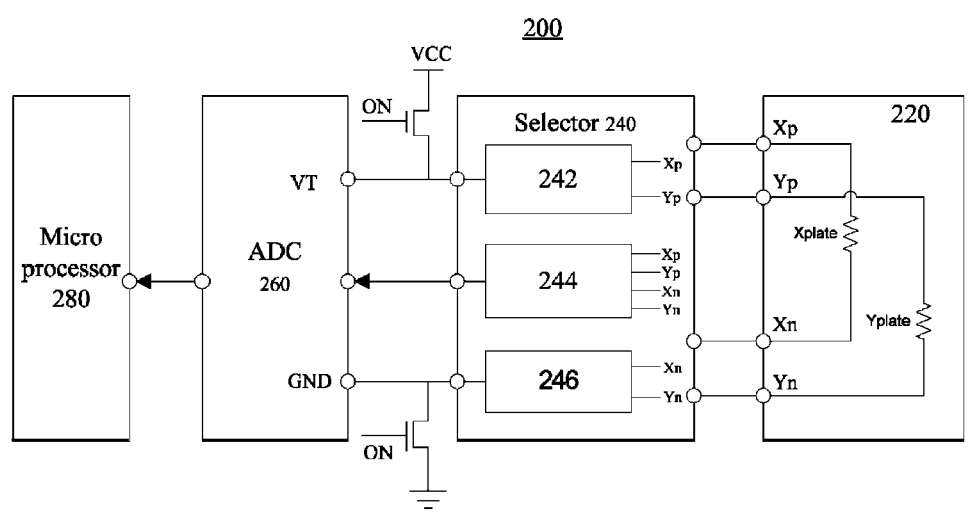
FIG. 4 is a block diagram showing a touch screen detecting device according to one embodiment of the present invention.

Referring now to FIG. 4, it is a block diagram showing a touch screen detecting device 200 according to one embodiment of the present invention. The device 200 can support not only single touch point detection but also motion tendency detection of two touch points. The device 200 includes a resistive touch screen 220, a selector 240, an analog-to-digital converter (ADC) 260 and a micro processor 280.

The resistive touch screen 220 includes an X conductive layer (also referred as a first conductive layer) along an X-axis direction and a Y conductive layer (also referred as a second conductive layer) along a Y-axis direction. The X conductive layer has a positive terminal Xp and a negative terminal Xn at the respective ends thereof along the X-axis direction. The Y conductive layer has a positive terminal Yp and a negative terminal Yn at the respective ends thereof along the Y-axis direction. Each conductive layer has a uniform linear resistivity along the respective directions. In one embodiment, Xplate is provided to denote a total resistance of the X conductive layer and may be about 300Ω in general. Yplate is provided to denote a total resistance of the Y conductive layer and may be about 700Ω in general. The X conductive layer is physically separated from the Y conductive layer by a gap or a spacer. When one touch point with enough pressure appears on the resistive touch screen 220, the X conductive layer contacts with the Y conductive layer at the touch point.

The selector 240 includes a positive reference voltage (VT) selector 242, a negative reference voltage (GND) selector 246 and a measuring terminal selector 244. The positive reference voltage selector 242 is configured to select one of the terminal Yp and the terminal Xp to connect to a positive reference voltage VT. The negative reference voltage selector 246 is configured to select one of the terminal Yn and the terminal Xn to connect to a ground reference GND. The measuring terminal selector 244 is configured to select one of the terminals Yp, Yn, Xp, and Xn as a measuring terminal. The ADC 260 is configured to sample an analog voltage on the measuring terminal of the selector 240 and convert the analog voltage into the digital voltage.

The micro processor 280 is configured to receive the digital voltage samples and recognize a motion tendency of two touch points on the resistive touch screen depending on the digital voltage samples. In one embodiment, the voltage samples comprise a series of first voltage samples V1(i), a series of second voltage samples V2(i), a series of third voltage samples V3(i) and a series of fourth voltage samples V4(i). When the positive terminal Yp is coupled to the positive reference voltage VT and the negative terminal Yn is grounded, the first voltage samples V1(i) are obtained by sampling a voltage on the positive terminal Xp, and the second voltage samples V2(i) are obtained by sampling a voltage on the negative terminal Xn. When the positive terminal Xp is coupled to the positive reference voltage VT and the negative terminal Xn is grounded, the third voltage samples V3(i) are obtained by sampling a voltage on the positive terminal Yp, and the fourth voltage samples V4(i) are obtained by sampling a voltage on the negative terminal Yn.

Herein, i is a sampling number and i=1~N, where N is a positive integer in relation to a sampling time length and a sampling frequency. The voltage samples having the same sampling sequence number are sampled in the same sampling period. Similarly, the voltage samples having the different sampling sequence number are sampled in different sampling periods. For example, the microprocessor 280 may receive a series of voltage samples: V1(1), V2(1), V3(1), V4(1), V1(2), V2(2), V3(2), V4(2), V1(3) ... V1(i), V2(i), V3(i), and V4(i). In another embodiment, only the first voltage samples V1(i) and the second voltage samples V2(i) are obtained in the some sampling periods. Two or four voltage samples with the same sampling number may be called as one sample or one sample point.

Next, how to recognize the motion tendency of the two touch points on the resistive touch screen depending on the received voltage samples will be described hereafter in detail. Firstly, it requires to further explain a working principle of the resistive touch screen herein.

Figure 1A:
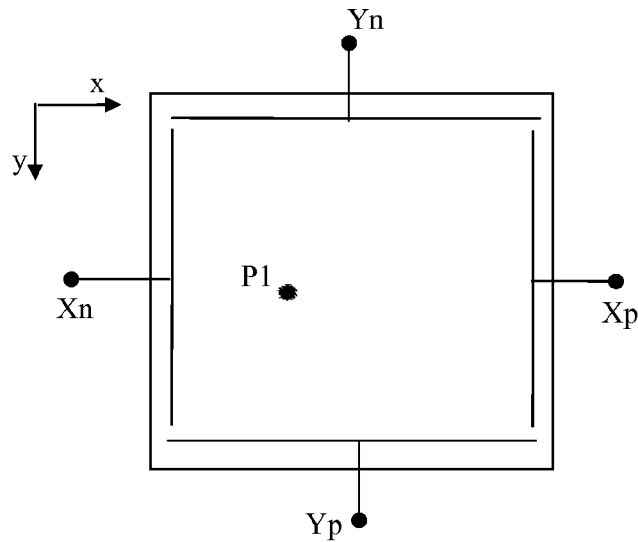
FIG. 1A is a schematic diagram showing a resistive touch screen with a single touch point thereon.
Figure 1B:
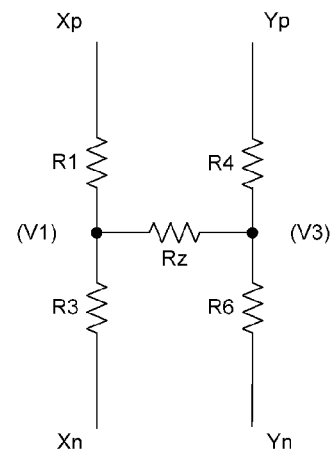
FIG. 1B is a circuit diagram showing an equivalent electrical circuit to the resistive touch screen shown in FIG. 1A.
Figure 2A:
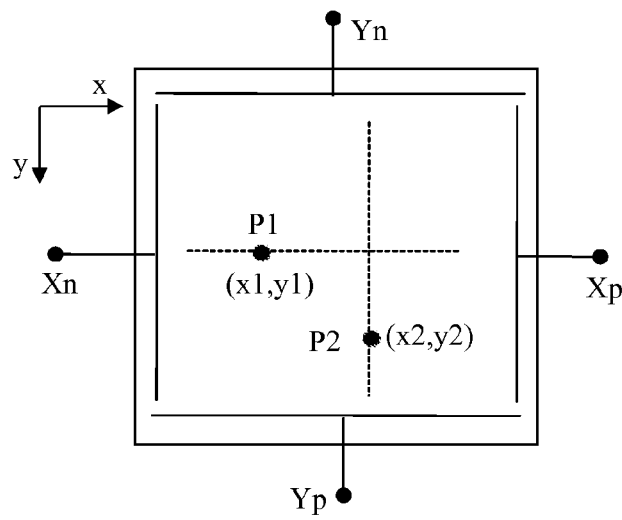
FIG. 2A is a schematic diagram showing the resistive touch screen with two touch points P1 and P2 thereon, wherein coordinates of the touch point P1 is (x1,y1), coordinates of the touch point P2 is (x2,y2), and a position relation of the touch points P1 and P2 satisfies x2>x1 and y2>y1.
Figure 2B:
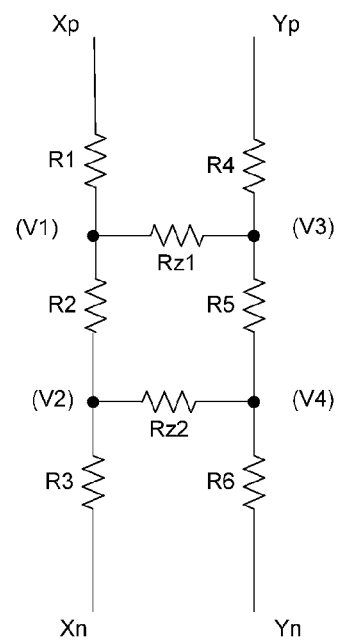
FIG. 2B is a circuit diagram showing an equivalent electrical circuit to the resistive touch screen shown in FIG. 2A.

FIG. 2A is a schematic diagram showing the resistive touch screen with two touch points P1 and P2 thereon, wherein coordinates of the touch point P1 are (x1,y1), coordinates of the touch point P2 are (x2,y2), a position relation of the two touch points P1 and P2 satisfies x2>x1 and y2>y1. It is also called that the two touch points P1 and P2 are located on a first or principal diagonal of the touch screen for simplicity. FIG. 2B is a circuit diagram showing an equivalent electrical circuit to the resistive touch screen shown in FIG. 2A. Referring to FIG. 2B, the first voltage sample V1 must be larger than the second voltage samples V2, namely V1−V2>0, if the position relation of the two touch points P1 and P2 satisfies x2>x1 and y2>y1 as shown in FIG. 2A. Conversely, it is concluded that the position relation of the two touch points P1 and P2 satisfies x2>x1 and y2>y1 if the first voltage sample V1 is larger than the second voltage sample V2. Then, it is further concluded that a motion tendency of the two touch points P1 and P2 are contraction or expansion (both referred as a non-rotating motion) along the first diagonal of the touch screen if all the differences V1(i)−V2(i) between the first voltage samples V1(i) and the second voltage samples V2(i) are larger than 0.

Figure 3A:
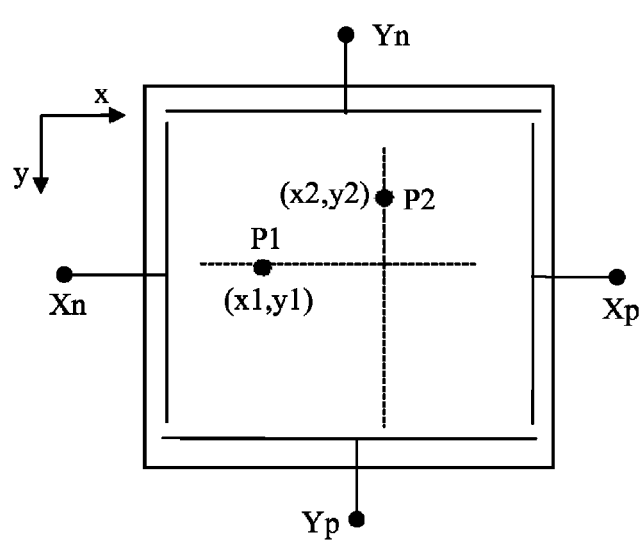
FIG. 3A is a schematic diagram showing the resistive touch screen with two touch points P1 and P2 thereon, wherein the coordinates of the touch point P1 is (x1,y1), the coordinates of the touch point P2 is (x2,y2), and the position relation of the touch points P1 and P2 satisfies x2>x1 and y2<y1.
Figure 3B:
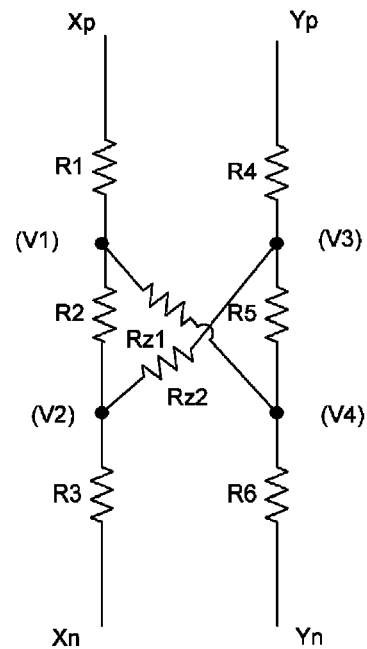
FIG. 3B is a circuit diagram showing an equivalent electrical circuit to the resistive touch screen shown in FIG. 3A.

FIG. 3A is a schematic diagram showing the resistive touch screen with two touch points P1 and P2 thereon, wherein coordinates of the touch point P1 are (x1,y1), coordinates of the touch point P2 are (x2,y2), a position relation of the two touch points P1 and P2 satisfies x2>x1 and y2<y1. It is also called that the two touch points P1 and P2 are located on a second or secondary diagonal of the touch screen for simplicity. FIG. 3B is a circuit diagram showing an equivalent electrical circuit to the resistive touch screen shown in FIG. 3A. Referring to FIG. 3B, the first voltage sample V1 must be less than the second voltage samples V2, namely V1−V2<0, if the position relation of the two touch points P1 and P2 satisfies x2>x1 and y2<y1 as shown in FIG. 3A. Conversely, it is concluded that the position relation of the two touch points P1 and P2 satisfies x2>x1 and y2<y1 if the first voltage sample V1 is less than the second voltage sample V2. Then, it is further concluded that the motion tendency of the two touch points P1 and P2 is contraction or expansion along the second diagonal of the touch screen if all the differences V1(i)−V2(i) are less than 0.

When the two touch points P1 and P2 on the resistive touch screen have the same y coordinate or the same x coordinate, the resistor R5 or R2 shown in FIG. 2B is equal to zero, whereby the first voltage sample V1 is equal to the second voltage sample V2, namely V1−V2=0. Hence, it is concluded that the two touch points P1 and P2 are counterclockwise rotating or clockwise rotating (both referred as a rotating motion) if some differences V1(i)−V2(i) are less than 0, and some differences V1(i)−V2(i) are larger than 0.

Figure 5:
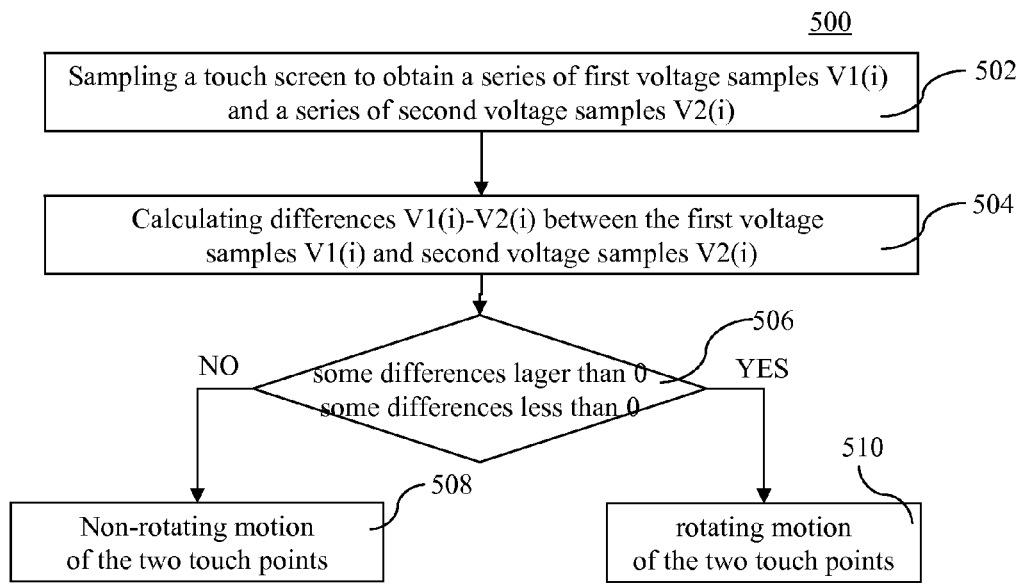
FIG. 5 is a flow chart showing a method for recognizing a motion tendency of two touch points on the resistive touch screen according to one embodiment of the present invention.

FIG. 5 is a flowchart showing a process 500 for recognizing a motion tendency of two touch points on the resistive touch screen according to one embodiment of the present invention. Referring to FIG. 5, the process 500 comprises the following operations.

At 502, a series of first voltage samples V1(i) are obtained by sampling the positive terminal Xp, and a series of second voltage samples V2(i) are obtained by sampling the negative terminal Xn when the positive terminal Yp is coupled to the positive reference voltage VT and the negative terminal Yn is grounded.

At 504, differences V1(i)−V2(i) between the first voltage samples V1(i) and the second voltage samples V2(i) are calculated.

At 506, it is determined whether some differences V1(i)−V2(i) are larger than zero and some differences V1(i)−V2(i) are less than zero. If yes, the process 500 is taken to 510, otherwise the process is taken to 508.

At 508, it is concluded that the motion tendency of the two touch points P1 and P2 on the touch screen is contraction or expansion (both referred as the non-rotating motion).

At 510, it is concluded that the motion tendency of the two touch points P1 and P2 on the touch screen is counterclockwise rotation or clockwise rotation (both referred as the rotating motion).

As a result, the general motion tendency of the two touch points on the touch screen is recognized depending on the received voltage samples V1(i) and V2(i). The method 500 shown in FIG. 5 is a theoretical method to recognize the general motion tendency of the two touch points. Depending on implementation, some modifications may be made to the process 500 because of the impact of various noises. For example, the operation of 506 is modified to determine whether the proportion of negative and positive of the differences V1(i)−V2(i) is larger than a lower threshold (e.g. 5%) and less than a higher threshold (e.g. 95%). If yes, the process is taken to 510, otherwise, the process 500 is taken to 508.

Figure 6A:
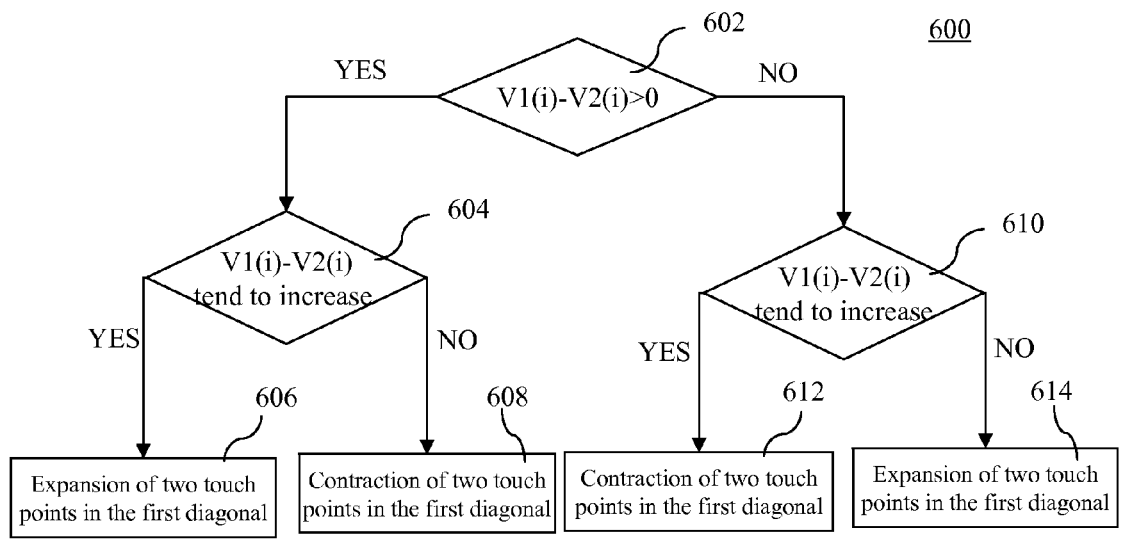
FIG. 6A is a flow chart showing a first embodiment of a method for recognizing a non-rotating motion of the two touch points on the resistive touch screen.

In one embodiment, it requires to further determine that the motion tendency of the two touch points P1 and P2 on the touch screen is in contraction or expansion after the general motion tendency of the two touch points on the touch screen is recognized as the non-rotating motion. FIG. 6A is a flowchart showing a first embodiment of a process for recognizing the non-rotating motion of the two touch points on the resistive touch screen. In order to fully understand the process, an exemplary embodiment for recognizing the non-rotating motion of the two touch points is described hereafter firstly.

Referring to FIG. 2B, the following formulas are deduced:

$$V2 = Iy * R6 + Iy * \frac{R5}{R} * Rz2 \quad (1)$$

$$V1 = Iy * R6 + Iy * \frac{R5}{R} * (Rz2 + R2) \quad (2)$$

where
R=Rz1+Rz2+R2+R5,
ly=VT/(R4+R6+Rb),
Rb=R5//(Rz1+Rz2+R2),
where ly is a current flowing through the Y conductive layer.

Depending on the formulas (1) and (2), the difference between the first voltage sample V1 and the second voltage sample V2 can be calculated as follows:

$$V1 - V2 = VT \frac{Rb}{R4 + R6 + Rb} \frac{R2}{R2 + Rz1 + Rz2} \quad (3)$$

$$= VT \frac{1}{\frac{Yplate - R5}{Rb} + 1} \frac{1}{\frac{Rz1 + Rz2}{R2} + 1}$$

It can be seen that the difference V1–V2 between the first voltage sample V1 and the second voltage sample V2 increases with the increase of the resistor R5 or R2. Hence, it is concluded that the two touch points are expanding on the touch screen if the difference the first voltage sample V1 and the second voltage sample V2 tends to increase. On the contrary, it is concluded that the two touch points are contracting on the touch screen if the difference the first voltage sample V1 and the second voltage sample V2 tends to decrease.

Similarly, the difference V1–V2 decreases with the increase of the resistor R5 or R2 since the difference V1–V2 shown in FIG. 3B is negative. Hence, it is concluded that the two touch points are expanding on the touch screen if an absolute value V1–V2 tends to increase. On the contrary, it is concluded that the two touch points are contracting on the touch screen if the absolute value V1–V2 tends to decrease.

Figure 6B:
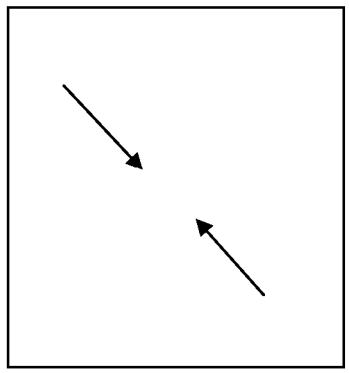
FIG. 6B is a schematic diagram showing a contraction of the two touch points located on a first diagonal of the resistive touch screen.
Figure 6C:
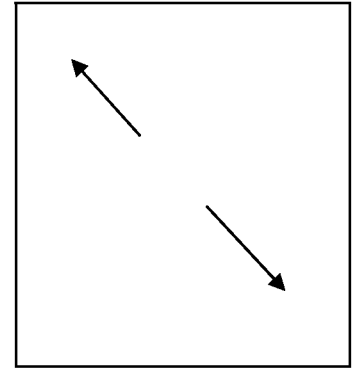
FIG. 6C is a schematic diagram showing an expansion of the two touch points located on a first diagonal of the resistive touch screen.

Referring to FIG. 6A, the process 600 in the first embodiment comprises the following operations. At 602, it is determined whether the differences V1(i)–V2(i) are larger than zero. If yes, the process 600 is taken to 604, otherwise, the differences V1(i)–V2(i) are less than zero, the process 600 is taken to 610. At 604, it is determined whether the differences V1(i)–V2(i) tend to increase. If yes, the process 600 is taken to 606, where it is determined that the motion tendency of the two touch points is expansion in the first diagonal of the touch screen (as shown in FIG. 6C); otherwise, the differences V1(i)–V2(i) tend to decrease, the process 600 is taken to 608, where it is determined that the motion tendency of the two touch points is contraction in the first diagonal of the touch screen (as shown in FIG. 6B).

Figure 6D:
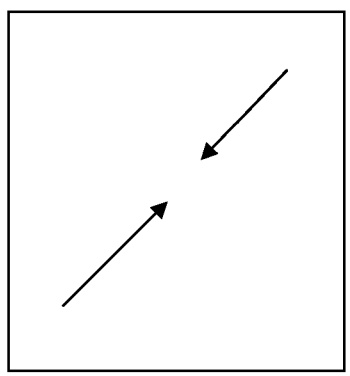
FIG. 6D is a schematic diagram showing the contraction of the two touch points located on a second diagonal of the resistive touch screen.
Figure 6E:
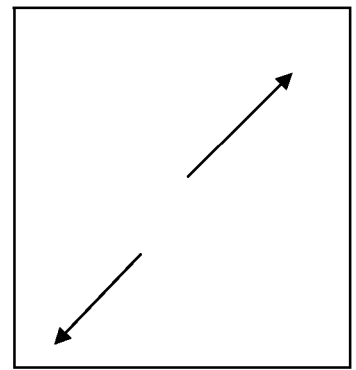
FIG. 6E is a schematic diagram showing the expansion of the two touch points located on a second diagonal of the resistive touch screen.

At 610, it is determined whether the differences V1(i)–V2(i) tend to increase. If yes, the process 600 is taken to 612, where it is determined that the motion tendency of the two touch points is contraction in the second diagonal of the touch screen (as shown in FIG. 6D); otherwise, the differences V1(i)–V2(i) tend to decrease, the process 600 is taken to 614, where it is determined that the motion tendency of the two touch points is expansion in the second diagonal of the touch screen (as shown in FIG. 6E).

Figure 6F:
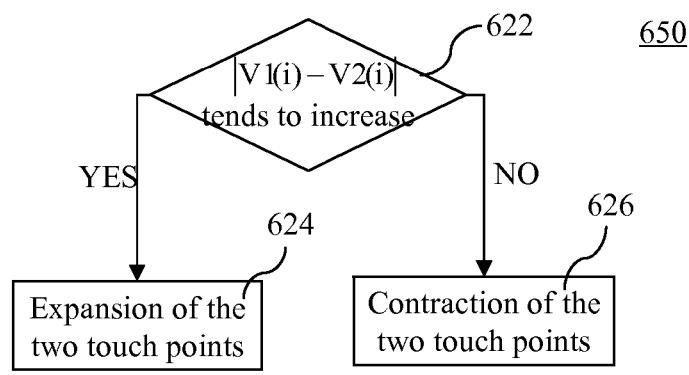
FIG. 6F is a flow chart showing a second embodiment of the method for recognizing the non-rotating motion of the two touch points on the resistive touch screen.

FIG. 6F is a flowchart showing a second embodiment of the process for recognizing the non-rotating motion of the two touch points on the resistive touch screen. Referring to FIG. 6F, the process 650 in the second embodiment comprises the following operations. At 622, it is determined whether absolute values |V1(i)–V2(i)| of the differences V1(i)–V2(i) tend to increase. If yes, the process 650 is taken to 624, otherwise, the absolute values |V1(i)–V2(i)| tend to decrease, the process 650 is taken to 626. At 624, it is determined that the motion tendency of the two touch points on the touch screen is expansion (as shown in FIG. 6C and FIG. 6E). At 626, it is determined that the motion tendency of the two touch points on the touch screen is contraction (as shown in FIG. 6B and FIG. 6D). As described above, it does not require to calculate the coordinates of the two touch points or the distance between the two touch points, only requiring to calculate the difference between the first voltage samples V(i) and the second voltage samples V(i), thereby reducing complexity and computation of in the embodiment of the present invention. Additionally, even if a few voltage samples V(i) and V2(i) may result in some error conclusions because of the impact of noise or other facts, but the overall conclusion will still be correct since a series of voltage samples V(i) and V2(i) are sampled continuously in the embodiment of the present invention.

In one embodiment, it also requires to further determine that the motion tendency of the two touch points P1 and P2 on the touch screen is counterclockwise rotation or clockwise rotation after the general motion tendency of the two touch points on the touch screen is recognized as the rotating motion. FIG. 7A is a flowchart showing a first embodiment of a process for recognizing a rotating motion of the two touch points on the resistive touch screen. In order to fully understand the process, some knowledge for recognizing the rotating motion of the two touch points is described hereafter firstly.

As described above, the following formulas are deduced by referring to FIG. 2B:

$$V2 = Iy * R6 + Iy * \frac{R5}{R} * Rz2 \quad (1)$$

$$V1 = Iy * R6 + Iy * \frac{R5}{R} * (Rz2 + R2) \quad (2)$$

Wherein R=Rz1+Rz2+R2+R5,
ly=VT/(R4+R6+Rb1),
where Rb1=R5//(Rz1+Rz2+R2), ly is a current flowing through the Y conductive layer.

Similarly, the following formulas are got by referring to FIG. 2B:

$$V4 = Ix * R3 + Iy * \frac{R2}{R} * Rz2 \quad (4)$$

$$V3 = Ix * R3 + Iy * \frac{R2}{R} * (Rz2 + R2) \quad (5)$$

Wherein R=Rz1+Rz2+R2+R5,
lx=VT/(R1+R3+Rb2),
where Rb2=R2//(Rz1+Rz2+R5), lx is a current flowing through the X conductive layer.

Depending on the formulas (1) and (2), the difference between the first voltage sample V1 and the second voltage sample V2 is:

$$V1 - V2 = VT \frac{Rb}{R4 + R6 + Rb} \frac{R2}{R2 + Rz1 + Rz2} \quad (3)$$

$$= VT \frac{1}{\frac{Yplate - R5}{Rb} + 1} \frac{1}{\frac{Rz1 + Rz2}{R2} + 1}$$

Depending on the formulas (4) and (5), the difference between the first voltage sample V3 and the second voltage sample V4 is:

$$V3 - V4 = Ix \frac{R2 * R5}{R} = \frac{VT * R2 * R5}{R * Xplate - R2 * R2} \quad (6)$$

The following formula is set depending on the formulas (3) and (6):

$$X = \frac{Xplate}{V1 - V2} - \frac{Yplate}{V3 - V4} \quad (7)$$

$$= \frac{Yplate * R2 * R2 - Xplate * R5 * R5}{VT * R2 * R5}$$

$$= \frac{1}{VT} \left( \frac{R2}{R5} * Yplate - \frac{R5}{R2} * Xplate \right)$$

Referring to FIGS. 2A and 2B, it can be seen that the resistance value of the resistor R2 indicates a distance value between the two touch points P1 and P2 along the X-axis direction, and the resistance value of the resistor R5 indicates a distance value between the two touch points P1 and P2 along the Y-axis direction.

Therefore, if the two touch points locate on the first diagonal as shown in FIG. 2A, the following conclusions can be obtained according to the formula (7): when a connection line of the two touch points infinitely approximate to a horizontal line (in parallel with the X-axis), the resistance value of the resistor R2 is far larger than that of the resistor R5, so the value of X is infinite; when the connection line of the two touch points infinitely approximate to a vertical line (in parallel with the Y-axis), the resistance value of the resistor R2 is far less than that of the resistor R5, so the value of the X is infinitesimal.

Similarly, if the two touch points locate on the second diagonal as shown in FIG. 3A, the following conclusions can be obtained according to the formula (7) since a sign bit of the difference V1-V2 shown in FIG. 3A is opposite to that of the difference V1-V2 shown in FIG. 2A: when the connection line of the two touch points infinitely approximate to the horizontal line, the resistance value of the resistor R2 is far larger than that of the resistor R5, so the value of X is infinitesimal; when the connection line of the two touch points infinitely approximate to the vertical line, the resistance value of the resistor R2 is far less than that of the resistor R5, so the value of the X is infinite.

Hence, X is referred as a rotating parameter in the embodiment of the present invention. FIG. 7G schematically shows a physical meaning of the rotating parameter X, where P close to the horizontal dot line indicates that the rotating parameter X is positive when the two touch points on the first diagonal approximate to the horizontal dot line, N close to the horizontal dot line indicates that the rotating parameter X is negative when the two touch points on the second diagonal approximate to the horizontal dot line, P close to the vertical dot line indicates that the rotating parameter X is positive when the two touch points on the second diagonal approximate to the vertical dot line, and N close to the vertical dot line indicates that the rotating parameter X is negative when the two touch points on the first diagonal approximate to the horizontal dot line.

In another embodiment, a modified rotating parameter X' may be provided, wherein $$X' = \frac{Xplate}{|V1 - V2|} - \frac{Yplate}{|V3 - V4|}$$

The modification to the rotating parameter has no effect on the above conclusions when the two touch points locate on the first diagonal as shown in FIG. 2A. however, the modification to the rotating parameter may lead to reversed conclusions when the two touch points locate on the first diagonal as shown in FIG. 3A. the reversed conclusions comprises: when the connection line of the two touch points infinitely approximate to the horizontal line, the value of X' is infinite; when the connection line of the two touch points infinitely approximate to the vertical line, the value of the X' is infinitesimal. FIG. 7B schematically shows a physical meaning of the modified rotating parameter X'.

Referring to FIG. 7A, the method 700 in the first embodiment comprises the following operations. At 702, it is determined whether the differences V1($i$)–V2($i$) are from positive to negative. If yes, the process 700 is taken to 704; otherwise, the differences V1($i$)–V2($i$) are from negative to positive, the process 700 is taken to 710. An exemplary method to determine whether the differences V1($i$)–V2($i$) are from positive to negative comprises:

setting $d(k)=V1(k)-V2(k)$, $k \in i$;

if $d(k)d(k+1)<0$, $d(k)>0$ and $d(k+1)<0$, determining that the differences V1($i$)–V2($i$) are from positive to negative, wherein k, k+1, k+2, k−1 etc. are adjacent touch samples, where the difference V1($i$)–V2($i$) equal to zero; if $d(k)d(k+1)<0$, $d(k)<0$ and $d(k+1)>0$, determining that the differences V1($i$)–V2($i$) are from negative to positive.

At 704, it is determined whether the modified rotating parameters X'(i) of adjacent touch samples where the difference V1($i$)–V2($i$) equal to zero are larger than zero, wherein $$X'(i) = \frac{Xplate}{|V1(i) - V2(i)|} - \frac{Yplate}{[V3(i) - V4(i)]}.$$

If yes, the process 700 is taken to 706, where it is determined that the two touch points counterclockwise rotate (as shown in FIG. 7C); otherwise, the process 700 is taken to 708, where it is determined that the two touch points clockwise rotate (as shown in FIG. 7D).

At 710, it is determined whether the modified rotating parameters X'(i) of adjacent touch samples where the differences V1($i$)–V2($i$) equal to zero are larger than zero.

If yes, the process 700 is taken to 712, where it is determined that the two touch points clockwise rotate (as shown in FIG. 7E); otherwise, the process 700 is taken to 714, where it is determined that the two touch points clockwise rotate (as shown in FIG. 7F).

Figure 7H:
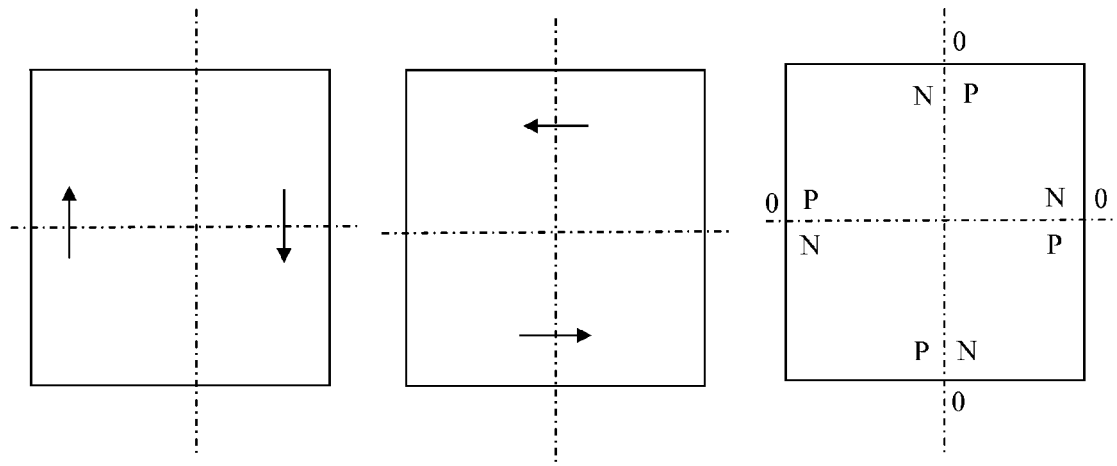
FIG. 7H is a flow chart showing a second embodiment of the method for recognizing the rotating motion of the two touch points on the resistive touch screen.
Figure 7H:
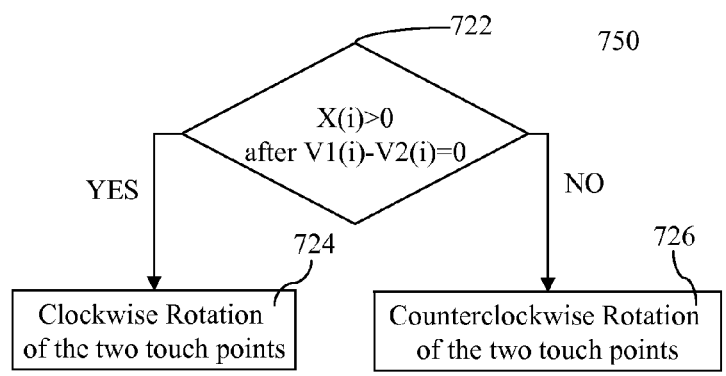

FIG. 7H is a flowchart 700 showing a second embodiment of the process for recognizing the rotating motion of the two touch points on the resistive touch screen. Referring to FIG. 7H, the process 750 in the second embodiment comprises the following operations.

At 722, it is determined whether the rotating parameters X(i) of adjacent touch samples after the differences V1(i)–V2(i) equal to zero are larger than zero, wherein $$X(i) = \frac{Xplate}{V1(i) - V2(i)} - \frac{Yplate}{V3(i) - V4(i)}.$$

If yes, the process 750 is taken to 724, otherwise, the process 750 is taken to 726. In one embodiment, setting d(k)=V1(k)–V2(k), k∈i; if d(k)d(k+1)<0, k+1, k+2, k+3 etc. are determined as the adjacent touch samples after the difference V1(i)–V2(i) equal to zero. At 724, it is determined that the two touch points clockwise rotate (as shown in FIG. 7E and FIG. 7D). At 726, it is determined that the two touch points counterclockwise rotate (as shown in FIG. 7C and FIG. 7F).

A third embodiment (not shown) of the process for recognizing the rotating motion of the two touch points may be provided by modifying the second embodiment shown in FIG. 7H. It is determined whether the rotating parameters X(i) of adjacent touch samples before the differences V1(i)–V2(i) equal to zero are larger than zero. If yes, it is determined that the two touch points counterclockwise rotate; otherwise, it is determined that it is determined that the two touch points clockwise rotate.

A fourth embodiment of the process for recognizing the rotating motion of the two touch points may be provided. In the fourth embodiment, the rotating parameters X(i) are detected all the time. If it is detected that the rotating parameters X(i) change from a larger positive number to a smaller negative number suddenly, it is concluded that the two touch points counterclockwise rotate. If it is detected that the rotating parameters X(i) change from a smaller negative number to a larger positive number suddenly, it is concluded that the two touch points clockwise rotate. Additionally, ordinary peoples in the art may provide other embodiments to recognize the rotating motion of the two touch points according to the rotating parameters X(i).

Furthermore, a rotating angel of the two touch points is determined by counting times of the differences V1(i)–V2(i) passing though zero. Provided that d(i)=V1(i)–V2(i), if d(i)d(i+1)<0, it indicates that the differences V1(i)–V2(i) passing though zero one times. If the times is 1, the rotating angel is determined as 90 degree. If the times is 2, the rotating angel is determined as 180 degree.

Figure 8:
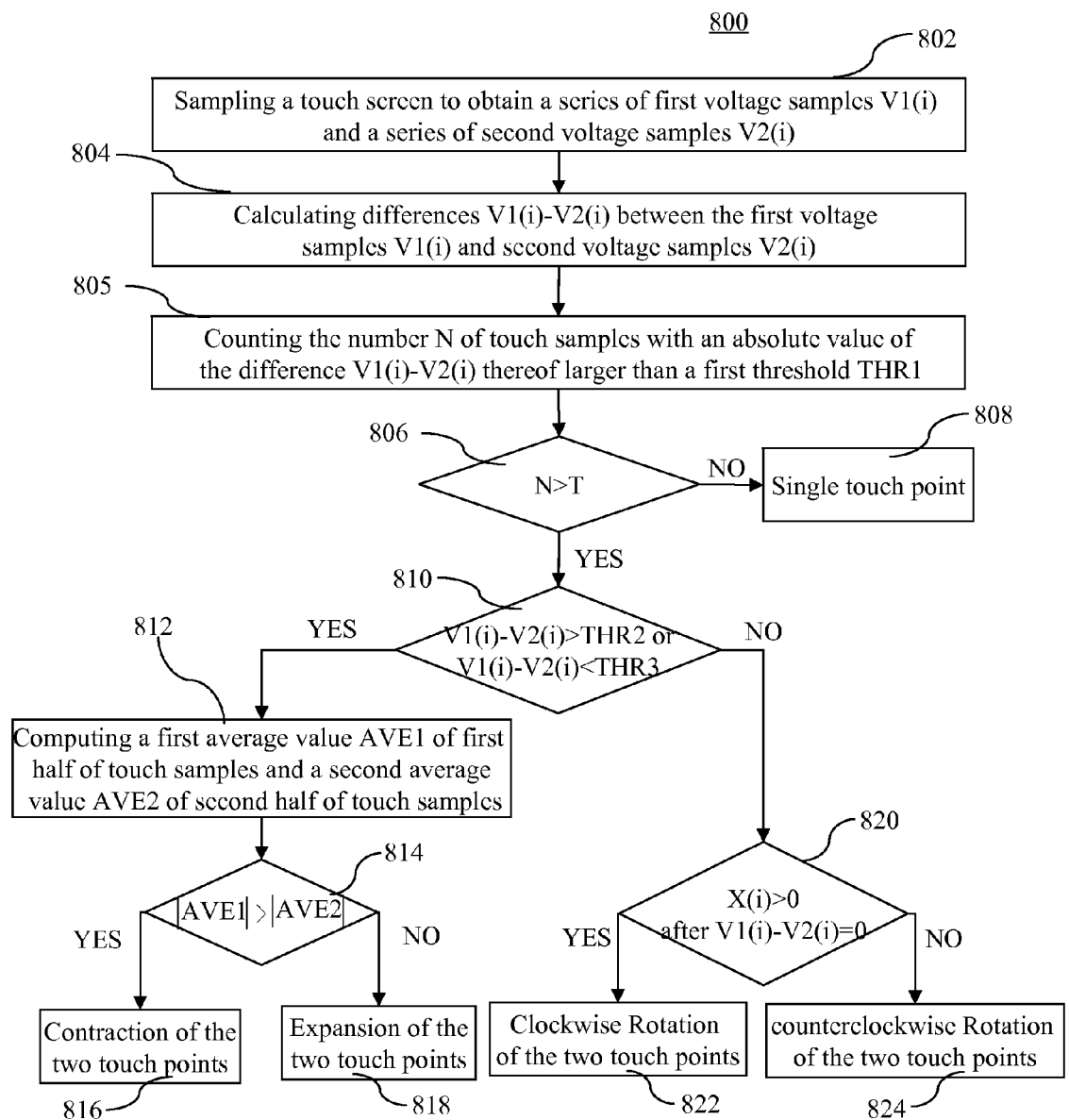
FIG. 8 is an exemplary flow chart illustrating the method for recognizing the motion tendency of the two touch points on the resistive touch screen according to one embodiment of the present invention.

For further understanding the present invention, an exemplary application of the present invention is described hereafter. FIG. 8 is an exemplary flowchart 800 illustrating the process for recognizing the motion tendency of the two touch points on the resistive touch screen according to one embodiment of the present invention. Referring to FIG. 8, the method 800 comprises the following operations.

At 802, a series of first voltage samples V1(i) are obtained by sampling the positive terminal Xp and a series of second voltage samples V2(i) are obtained by sampling the negative terminal Xn when the positive terminal Yp is coupled to the positive reference voltage VT and the negative terminal Yn is grounded. At 804, differences V1(i)–V2(i) between the first voltage samples V1(i) and the second voltage samples V2(i) are calculated. At 805, the number N of touch samples with an absolute value of the difference V1(i)–V2(i) thereof larger than a first threshold THR1 is counted. The first threshold THR1 is a positive value near to zero. At 806, it is determined whether the number N is larger than a predefined number threshold T. If yes, the process 800 is taken to 810, otherwise, the process is taken to 808, where it is concluded that the touch screen has a singe touch point thereon. At 810, it is determined whether all the difference V1(i)–V2(i) is larger than a second threshold THR2 or all the difference V1(i)–V2(i) is less than a third threshold THR3. If yes, the process 800 is taken to 812; otherwise, the process 800 is taken to 820. The second threshold THR2 is less than or equal to 0, the third threshold THR3 is larger than or equal to 0. The first threshold and the second threshold are set to eliminate some interference.

At 812, a first average value AVE1 of the differences V1(i)–V2(i) of the first half of touch simples is computed and a second average value AVE2 of the differences V1(i)–V2(i) of the second half of touch simples is computed.

At 814, it is determined that an absolute value |AVE1| of the first average value is larger than the absolute value |AVE2| of the second average value. If yes, it indicates that the absolute value |V1(i)–V2(i)| tends to decrease, the process 800 is taken to 816, where it is concluded that the two touch points are contracting on the touch screen; otherwise, it indicates that the absolute value |V1(i)–V2(i)| tends to increase, the process 800 is taken to 818, where it is concluded that the two touch points are expanding on the touch screen.

At 820, it is determined whether the rotating parameters X(i) of adjacent touch samples after the differences V1(i)–V2(i) equal to zero are larger than zero, wherein $$X(i) = \frac{Xplate}{V1(i) - V2(i)} - \frac{Yplate}{V3(i) - V4(i)}.$$

If yes, the process 800 is taken to 822, otherwise, the process 800 is taken to 824. At 822, it is determined that the two touch points clockwise rotate. At 824, it is determined that the two touch points counterclockwise rotate.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for detecting a touch screen, the touch screen including a first conductive layer and a second conductive layer, each conductive layer having a positive terminal and a negative terminal, the method comprising:
   coupling the positive terminal of the second conductive layer to a positive reference voltage, coupling the negative terminal of the second conductive layer to a negative reference voltage, sampling the positive terminal of the first conductive layer to obtain a series of first voltage samples V1(i), sampling the negative terminal of the first conductive layer to obtain a series of second voltage samples V2(i);
   coupling the positive terminal of the first conductive layer to the positive reference voltage, coupling the negative terminal of the first conductive layer to the negative reference voltage, sampling the positive terminal of the second conductive layer to obtain a series of third voltage samples V3(i), sampling the negative terminal of the second conductive layer to obtain a series of fourth voltage samples V4(i), wherein i is a sampling number;

calculating a rotating parameter X(i) according to the first voltage samples V1(i), the second voltage samples V2(i), the third voltage samples V3(i) and the fourth voltage samples V4(i); and determining a rotating direction of two touch points in the touch screen according to the rotating parameter X(i), wherein the rotating parameter X(i) is a function of $$\frac{Xplate}{V1(i)-V2(i)} - \frac{Yplate}{V3(i)-V4(i)},$$

Xplate is a total resistance of the first conductive layer, and Yplate is a total resistance of the second conductive layer.

2. The method according to claim 1, wherein $$X(i) = \frac{Xplate}{V1(i)-V2(i)} - \frac{Yplate}{V3(i)-V4(i)},$$

and wherein said determining a rotating direction of two touch points in the touch screen according to the rotating parameter X(i) comprises:

determining whether the rotating parameters X(i) of adjacent samples after differences V1(i)–V2(i) equal to zero are larger than zero;

concluding that the rotating direction of the two touch points is clockwise if yes; and concluding otherwise that the rotating direction of the two touch points is counterclockwise.

3. The method according to claim 1, wherein $$X(i) = \frac{Xplate}{V1(i)-V2(i)} - \frac{Yplate}{V3(i)-V4(i)}$$

and wherein said determining a rotating direction of two touch points in the touch screen according to the rotating parameter X(i) comprises:

determining whether the rotating parameters X(i) of adjacent samples before differences V1(i)–V2(i) equal to zero are less than zero;

concluding that the rotating direction of the two touch points is clockwise if yes; and concluding otherwise that the rotating direction of the two touch points is counterclockwise.

4. The method according to claim 1, wherein $$X(i) = \frac{Xplate}{V1(i)-V2(i)} - \frac{Yplate}{V3(i)-V4(i)}$$

and wherein said determining a rotating direction of two touch points in the touch screen according to the rotating parameter X(i) comprises:

determining whether the rotating parameters change from positive to negative when an absolute value of a difference between two adjacent rotating parameters X(i) is larger than a predefined threshold, and one of the two adjacent rotating parameters X(i) is positive and the other of the two adjacent rotating parameters X(i) is negative;

concluding that the rotating direction of the two touch points is counterclockwise if yes; and concluding otherwise that the rotating direction of the two touch points is clockwise.

5. The method according to claim 1, wherein $$X(i) = \frac{Xplate}{V1(i)-V2(i)} - \frac{Yplate}{V3(i)-V4(i)},$$

and wherein said determining a rotating direction of two touch points in the touch screen according to the rotating parameter X(i) comprises:

determining whether the rotating parameters X(i) of adjacent samples after difference V1(i)–V2(i) equal to zero are larger than zero when the differences V1(i)–V2(i) between the first voltage samples and the second voltage samples are from positive to negative:

concluding that the rotating direction is counterclockwise if yes;

concluding otherwise that the rotating direction is clockwise;

determining whether the rotating parameters X(i) of adjacent samples after the difference V1(i)–V2(i) equal to zero are larger than zero when the differences V1(i)–V2(i) between the first voltage samples and the second voltage samples are from negative to positive:

concluding that the rotating direction is clockwise if yes;

concluding otherwise that the rotating direction is counterclockwise.

6. The method according to claim 1, further comprising:

determining a rotating angle of the two touch points by counting how many times of differences V1(i)–V2(i) between the first voltage samples and the first voltage samples passing though zero.

7. The method according to claim 1, further comprising:

concluding that a motion tendency of the two touch points on the touch screen is a rotation when some differences V1(i)–V2(i) between the first voltage samples and the first voltage samples are larger than 0 and some differences V1(i)–V2(i) between the first voltage samples and the first voltage samples are less than 0.

8. The method according to claim 1, further comprising:

determining whether all or most of differences V1(i)–V2(i) between the first voltage samples and the first voltage samples are larger than a second threshold or less than a third threshold;

determining whether absolute values of the differences V1(i)–V2(i) tend to increase if yes;

concluding that a motion tendency of the two touch points on the touch screen is rotation when differences V1(i)–V2(i) between the first voltage samples and the first voltage samples are larger than a third threshold or less than a second threshold.

9. The method according to claim 8, wherein the second threshold is less than or equal to zero, and the third threshold is larger than or equal to zero.

10. The method according to claim 1, further comprising:

counting a number of absolute values of differences V1(i)–V2(i) between the first voltage samples and the first voltage samples being larger than a first threshold; and concluding that there are two touch points on the touch screen when the number is larger than a predefined number threshold.

11. A device for detecting touch screen, comprising:

a touch screen having a first conductive layer and a second conductive layer, each of the first and second conductive layers having a positive terminal and a negative terminal;

a selector configured to couple the positive terminal of the second conductive layer to a positive reference voltage, couple the negative terminal of the second conductive layer to a negative reference voltage, couple the positive terminal of the first conductive layer to the positive reference voltage, and couple the negative terminal of the first conductive layer to the negative reference voltage;

an analog-to-digital converter configured to sample the positive terminal of the first conductive layer to obtain a series of first voltage samples $V1(i)$, sample the negative terminal of the first conductive layer to obtain a series of second voltage samples $V2(i)$, sample the positive terminal of the second conductive layer to obtain a series of third voltage samples $V3(i)$, and sample the negative terminal of the second conductive layer to obtain a series of fourth voltage samples $V4(i)$, wherein i is a sampling sequence number;

a micro-processor configured to calculate a rotating parameter $X(i)$ according to the first voltage samples $V1(i)$, the second voltage samples $V2(i)$, the third voltage samples $V3(i)$ and the fourth voltage samples $V4(i)$ and determine a rotating direction of two touch points on the touch screen according to the rotating parameter $X(i)$; and wherein the rotating parameter $X(i)$ is a function of and $$\frac{Xplate}{V1(i) - V2(i)} - \frac{Yplate}{V3(i) - V4(i)},$$

Xplate is a total resistance of the first conductive layer, and Yplate is a total resistance of the second conductive layer.

* * * * *